US008934948B2

(12) United States Patent
Holman, IV et al.

(10) Patent No.: US 8,934,948 B2
(45) Date of Patent: Jan. 13, 2015

(54) LOW PROFILE AIR DAMPER

(75) Inventors: Martin Earl Holman, IV, West Palm Beach, FL (US); Bruce Alan Ivanik, Boca Raton, FL (US); Douglas Wayne Moskowitz, Weston, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 866 days.

(21) Appl. No.: 13/092,261

(22) Filed: Apr. 22, 2011

(65) Prior Publication Data

US 2012/0267206 A1 Oct. 25, 2012

(51) Int. Cl.
*H04M 1/00* (2006.01)
*H04M 1/02* (2006.01)

(52) U.S. Cl.
CPC .................................. *H04M 1/0237* (2013.01)
USPC .... 455/575.1; 455/575.4; 267/34; 267/64.11; 267/75; 267/118; 267/119

(58) Field of Classification Search
CPC .................................. F16F 9/0227; F16F 9/26
USPC ............ 188/301–305, 297; 455/575.1, 575.4; 267/34, 64.11, 75, 118, 119, 124, 130, 267/140.11, 140.13
See application file for complete search history.

(56) References Cited

U.S. PATENT DOCUMENTS

| | | | |
|---|---|---|---|
| 4,588,054 A | 5/1986 | LeBaron | |
| 5,178,240 A | 1/1993 | Houghton | |
| 6,442,796 B2 | 9/2002 | Arisaka et al. | |
| 6,678,918 B2 | 1/2004 | Nakabayashi | |
| 7,278,522 B2 | 10/2007 | Reinhardt et al. | |
| 7,353,922 B2 | 4/2008 | Furuya et al. | |
| 7,412,270 B2 | 8/2008 | Takagi | |
| 7,418,279 B2 | 8/2008 | Takagi | |
| 2002/0158383 A1 | 10/2002 | Nakabayashi | |
| 2003/0141638 A1 | 7/2003 | Salice | |
| 2004/0089988 A1 | 5/2004 | Scott et al. | |
| 2004/0150143 A1 | 8/2004 | Zimmer et al. | |
| 2005/0040574 A1 | 2/2005 | Ivers et al. | |
| 2006/0011431 A1 | 1/2006 | Furuya et al. | |

(Continued)

FOREIGN PATENT DOCUMENTS

| | | |
|---|---|---|
| KR | 20090075967 | 7/2009 |
| WO | 2010023558 | 3/2010 |

OTHER PUBLICATIONS

EESR dated Aug. 8, 2012 for EP 11163786.

(Continued)

*Primary Examiner* — Thomas Irvin
*Assistant Examiner* — Mahbubur Rashid
(74) *Attorney, Agent, or Firm* — Jose Gutman; Fleit Gibbons Gutman Bongini & Bianco P.L.

(57) ABSTRACT

An air dampening assembly for an electronic device comprises a base member. A first piston housing is disposed on the base member. A second piston housing is disposed on the based member opposite the first piston housing. A sliding member is disposed between the first and second piston housing. A first piston is disposed on a first elongated member of the sliding member. The first piston housing is configured to receive the first piston. A second piston is disposed on a second elongated member of the sliding member. The second piston housing is configured to receive the second piston.

17 Claims, 7 Drawing Sheets

(56) References Cited

U.S. PATENT DOCUMENTS

| | | |
|---|---|---|
| 2007/0102252 A1 | 5/2007 | Yoshimoto |
| 2007/0145653 A1 | 6/2007 | Toczycki et al. |
| 2007/0218963 A1* | 9/2007 | Kim .......................... 455/575.4 |
| 2008/0070524 A1 | 3/2008 | Cheng et al. |
| 2008/0094699 A1 | 4/2008 | Miyagawa et al. |
| 2009/0061964 A1* | 3/2009 | Kim et al. ................. 455/575.4 |
| 2009/0149228 A1* | 6/2009 | Wang et al. ............... 455/575.4 |
| 2009/0149230 A1* | 6/2009 | Ruan ......................... 455/575.4 |
| 2009/0165348 A1 | 7/2009 | Aberg |
| 2010/0113110 A1* | 5/2010 | Lee ............................ 455/575.4 |
| 2010/0237074 A1 | 9/2010 | Yang et al. |

OTHER PUBLICATIONS

Examiner's Report dated Apr. 25, 2014 for Canadian Application No. 2,772,302.

\* cited by examiner

LOW PROFILE AIR DAMPER

FIELD OF THE DISCLOSURE

The present disclosure generally relates to mechanical dampers for portable electronic devices, and more particularly to a low profile air damper for use within portable electronic devices.

BACKGROUND

Many portable electronic devices comprise displays that can be moved independent of the keyboard or vice versa. For example, these devices usually allow the display to slide in a linear direction with respect to the keyboard. Conventional mechanisms currently used to provide this type of movement generally include bumpers that stop the movement of the display or keyboard at a designated location. This configuration can be problematic because the bumpers can be easily damaged or compromised when the device is dropped or when too much force is exerted on the bumpers when moving the display/keyboard.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
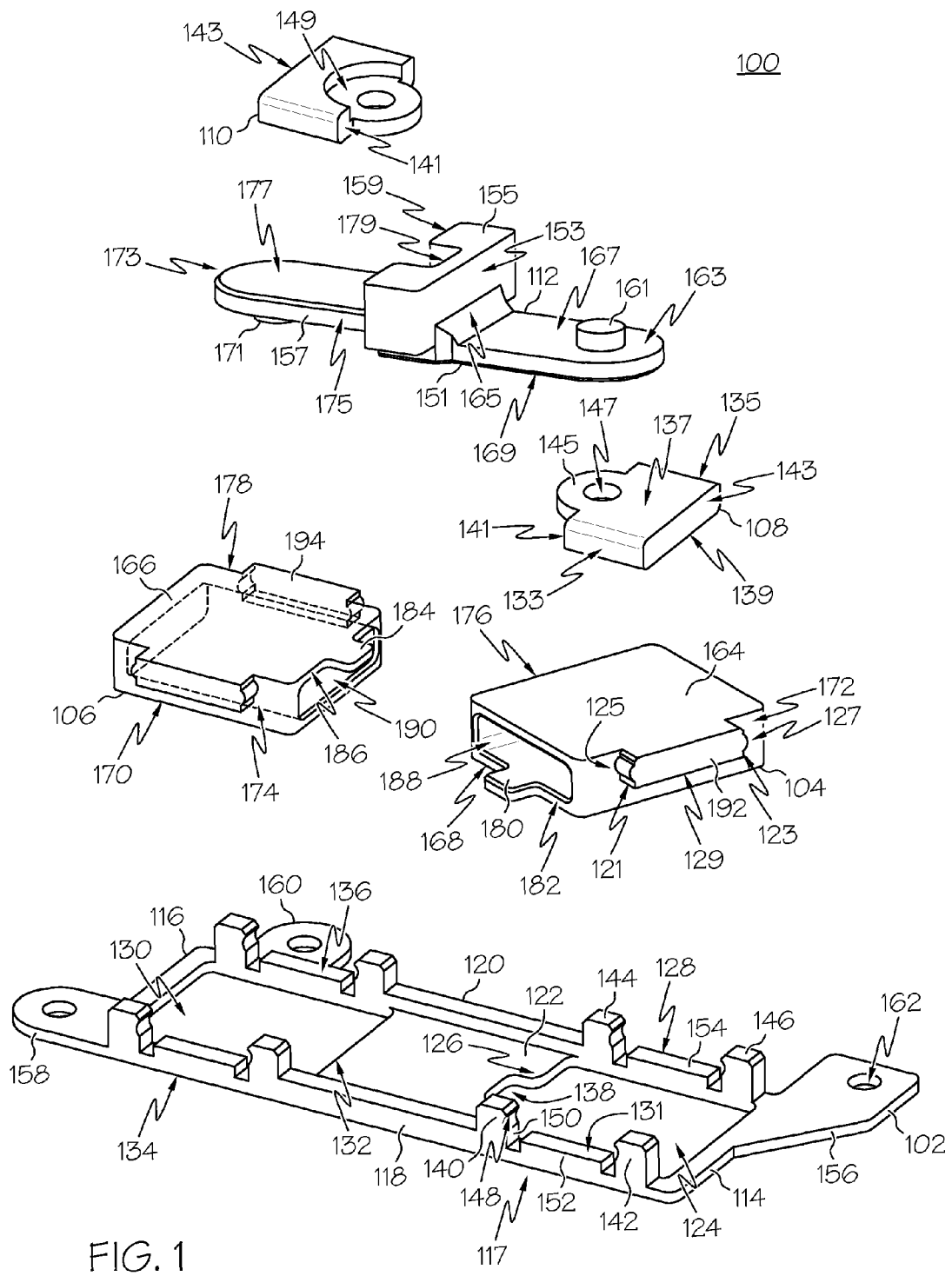
FIG. 1 is an exploded view of a low profile air damper assembly according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, and other similar devices.

The term "portable electronic device" is intended to broadly cover many different types of electronic devices that are portable. For example, and not for any limitation, a portable electronic device can include any one or a combination of the following: a wireless communication device, a laptop computer, notebook computer, personal computer, Personal Digital Assistant, tablets, and other handheld electronic devices that can be carried on one's person.

Described below is an air dampening assembly for an electronic device such as, but not limited, to a wireless communication device. In one example, the air dampening assembly comprises a base member. A first piston housing is disposed on the base member. A second piston housing is disposed on the base member opposite the first piston housing. A sliding member is disposed between the first and second piston housing. A first piston is disposed on a first elongated member of the sliding member. The first piston housing is configured to receive the first piston. A second piston is disposed on a second elongated member of the sliding member. The second piston housing is configured to receive the second piston.

The low profile air damper provides a dampening force that reduces the velocity of the slide mechanism when approaching the end of its travel. This reduction in velocity reduces the force exerted on the bumpers of the slide mechanism at the end of travel and also reduces any noise generated as the slide mechanism comes to a stop. The damper, in one example, compresses air in two chambers disposed on the damper's base when a portion of the slide mechanism contacts an arm coupled to two pistons. A force is exerted against the slide mechanism, which is a function of the velocity of travel (e.g., the higher the velocity, the higher the force). It should be noted that the low profile air damper, in one example, can be implanted within existing slide form factors.

Various materials or combinations of materials can be used to construct the low profile air damper and its components. For example, materials such as plastics, metals, metal alloys, composites, ceramics, and other inorganic or organic materials or combinations thereof may be used.

Low Profile Air Damper

Figure 2:
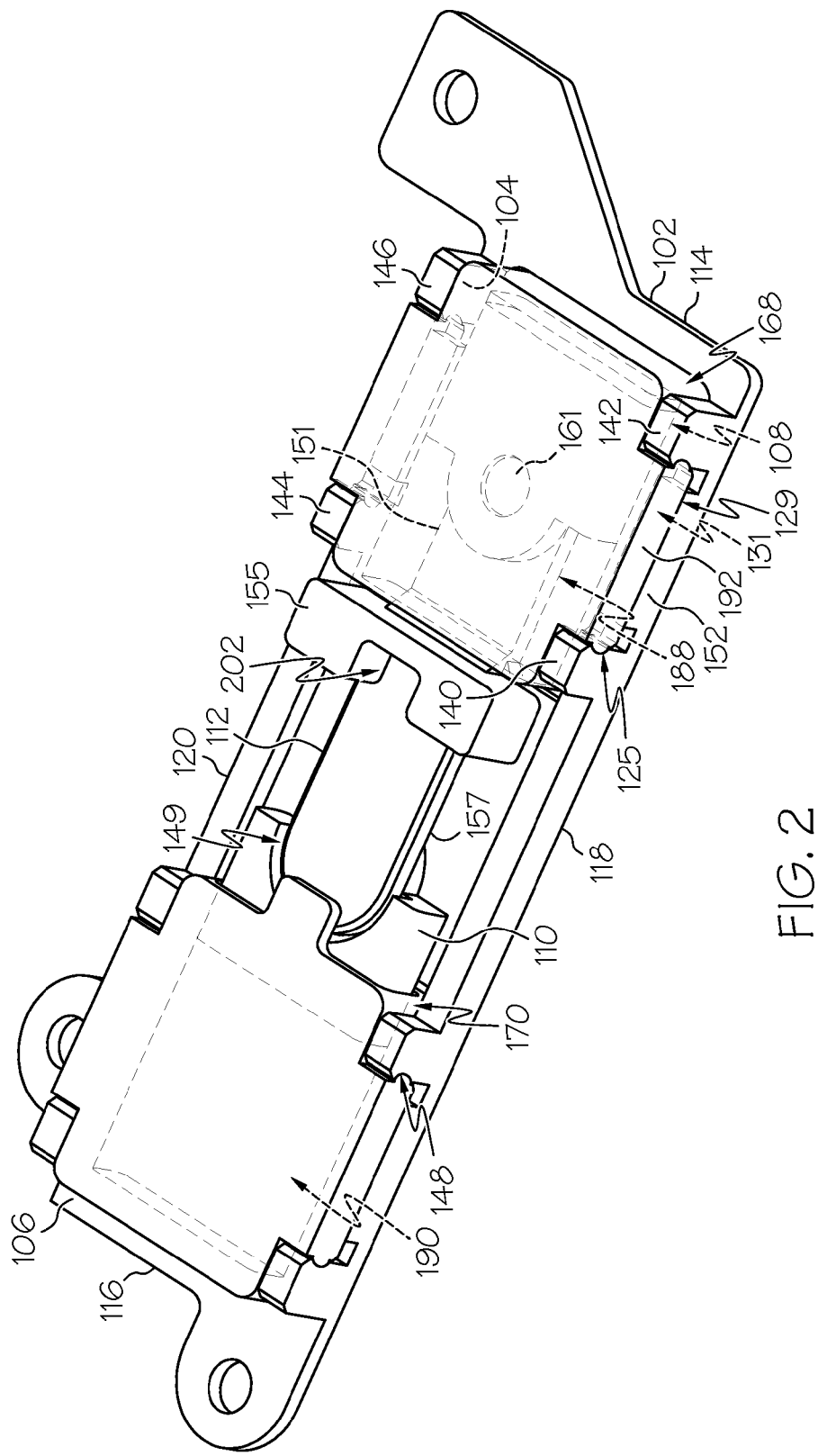
FIG. 2 shows a top-side view of the low profile air damper assembly of FIG. 1 according to one example.

FIG. 1 is an exploded view of an air damper assembly 100 according to one example. It should be noted that the air damper assembly 100 is a double air damper that provides dampening in two opposite directions. The air damper assembly 100 comprises a base member (or bracket) 102 that is configured to retain a first piston housing 104 and a second piston housing 106, as shown in FIG. 2. Each of the first and second piston housings 104, 106 are configured to receive a first piston 108 and a second piston 110, respectively. A sliding member (or piston arm) 112 couples to each of the pistons 108, 110 and is configured to slide each of the pistons 108, 110 in and out of their respective piston housing 104, 106.

The base member (or bracket) 102, in the example of FIG. 1, is substantially rectangular and comprises a first side 114, a second side 116, a third side 118, and a fourth side 120. The first and second sides 114, 116 are situated substantially opposite each other and perpendicular to the third and fourth sides 118, 120. The third and fourth sides 118, 120 are also situated substantially opposite each other. An inner support member 122 is disposed between the sides 114, 116, 118, 120 of the base member (or bracket) 102 and extends from the third side 118 to the fourth side 120.

The base member (or bracket) 102 also comprises a first cavity 124 defined by a first side 126 of the inner support member 122, the first side 114 of the base member 102, a first portion 117 of the third side 118 of the base member 102, and a first portion 128 of the fourth side 120 of the base member 102. A second cavity 130 is defined by a second side 132 of the inner support member 122, the second side 116 of the base member 102, a second portion 134 of the third side 118 of the base member 102, and a second portion 136 of the fourth side 120 of the base member 102. It should be noted that the first and second sides 126, 132 of the inner support member 122 are situated substantially opposite each other. Each of the cavities 124, 130 is configured to receive at least a portion of the first and second piston housings 104, 106, respectively. For example, FIG. 2 shows that a bottom portion 168, 170 of each piston housing 104, 106 is situated within the first and second cavities 124, 130, respectively.

Each of the first and second cavities 124, 130, in one example, is substantially rectangular. However, other configurations apply as well. At least one of the cavities 124, 130 comprises a region 138 that extends outward from the cavity and towards the other cavity. For example, FIG. 1 shows that the first cavity 124 comprises an outward extending region 138 that extends outward from the first cavity 124 and into the first side 126 of the inner support member 122. It should be noted that either or both of the cavities 124, 130 can comprise an outward extending portion 138. In other examples the cavities 124, 130 do not include this outward extending portion 138.

In the example of FIG. 1, the first portions 117, 128 of the third and fourth sides 118, 120 of the base member 102 that define the first cavity 124 also comprise a plurality of vertical members. For example, the first portion 117 of the third side 118 of the base member 102 comprises a first vertical member 140 and a second vertical member 142. The first portion 128 of the fourth side 120 of the base member 102 comprises a third vertical member 144 and a fourth vertical member 146. The third vertical member 144 is situated substantially opposite from the first vertical member 140. The fourth vertical member 146 is situated substantially opposite from the second vertical member 142. Each of the vertical members 140, 142, 144, 146 defines a recessed area 148 disposed on an inner wall 150 thereof that faces the corresponding vertical member on the same portion of the base member 102. For example, the recessed area 148 of the first vertical member 140 is disposed on an inner wall 150 thereof that faces the second vertical member 142.

FIG. 1 also shows that a first inner vertical member 152 is disposed between the first and second vertical members 140, 142 and a second inner vertical member 154 is disposed between the third and fourth vertical members 144, 146. In one example, the height of the inner vertical members 152, 154 is less than the height of the first, second, third, and fourth vertical members 140, 142, 144, 146. The distance that the inner vertical members 152, 154 extend along the third and fourth sides 118, 120, respectively, of the base member 102 is greater than the distance that the first, second, third, and fourth vertical members 140, 142, 144, 146 extend along the third and fourth sides 118, 120, respectively, of the base member 102. It should be noted that the second portion 134 of the third side 118 of the base member 102 and the second portion 136 of the fourth side of the base member 102 also comprise vertical members and inner vertical members similar to those discussed above, and accordingly they will not be described in further detail herein.

In one example, the base member 102 also comprises one or more coupling members 156, 158, 160 that each defines a cavity 162 for receiving a fastening member such as, but not limited to, a screw, bolt, rivet, or the like. These coupling members 156, 158, 160 extend outward from and are planar to one or more of the first, second, third, or fourth sides 114, 116, 118, 120 of the base member 102. However, other configurations of the coupling members 156, 158, 160 are applicable as well. The coupling members 156, 158, 160 allow the base member 102 to be coupled to a guide base 302 (FIG. 3) (or slide plate 304 of a slide mechanism 311 (FIG. 3)) on a portable electronic device or to the portable electronic device itself, which will be described in further detail below.

FIG. 1 further shows that each piston housing 104, 106 comprises a top portion 164, 166, a bottom portion 168, 170, a first side portion 172, 174, and a second side portion 176, 178, respectively. An outward extending member 180 extends outward from and is planar to an end region 182 of the bottom portion 168 of the first piston housing 104. This outward extending member 180 is configured to mate with the outward extending region 138 of the first cavity 124 and provides additional rigidity to the first piston housing 104 when disposed within the first cavity 124. The second piston housing 106 comprises an outward extending member 184 that extends outward from and is planar to an end region 186 of the top portion 166 of the second piston housing 106. The outward extending member 184 of the second piston housing 106 extends towards the center of the base member 102 and is configured to mate with a corresponding area 179 of the piston arm 112, as will be discussed in greater detail below. Each piston housing 104, 106 also comprises a cavity/chamber 188, 190 that is defined by the top portions 164, 166, the bottom portions 168, 170, the first side portions 172, 174, and the second side portions 176, 178 of the respective piston housings 104, 106. Each cavity/chamber 188, 190 is configured to receive one of the pistons 108, 110.

Each piston housing 104, 106 also comprises at least a first support member 192 disposed on the first side portion 172, 174 and a second support member 194 disposed on the second side portion 176, 178. The support members 192, 194 extend away from their respective side portion. A first end portion 121 and a second end portion 123 of each support member 192, 194 comprises a mating region 125, 127 that extends outward from the first and second end portions 121, 123, respectively. The mating regions 125, 127 are configured to mate with the recessed portion 148 of each corresponding vertical member 140, 142, 144, 146 of the base member 102, as shown in FIG. 2. A bottom portion 129 of each support member 192, 194 abuts a top surface 131 of the inner vertical member 152, 154 corresponding to that support member 192, 194, as shown in FIG. 2.

The pistons 108, 110, in the examples of FIG. 1 and FIG. 2, are geometrically configured to transition in and out of the chambers/cavities 188, 190 of the first and second piston housings 104, 106, respectively. Each piston 108, 110 comprises a first side 133 and a second side 135 situated opposite the first side 133. A third side 137 and a fourth side 139 are situated opposite from each other and substantially perpendicular to the first and second sides 133, 135. A fifth side 141 and a sixth side 143 are situated opposite from each other, substantially perpendicular and planar to the first and second sides 133, 137, and non-planar and substantially perpendicular to the third and fourth sides 137, 139. Each piston 108, 110 comprises a mating member 145 that extends outward from the third side 137 beyond the fifth side 141. In the example of FIG. 1, the mating member 145 comprises a curved configuration and is planar to the third side 137. However, other configurations are applicable as well.

A cavity 147 is defined within at least a portion of the mating member 145. The cavity 147 is configured to receive vertical retaining member 161, 171 disposed on an elongated member 151, 157 of the piston arm 112. The fourth side 139 comprises a recessed area 149 that extends from the fifth side 141 towards the sixth side 143. In one example, the cavity 147 extends through the mating member 145 into the recessed area 149. The recessed area 149, in one example, is configured to receive an end region 163, 173 of a corresponding elongated member 151, 157 of the piston arm 112, as shown in FIG. 2.

The piston arm 112 comprises a first elongated member 151 that extends outward from a first vertical side 153 of a vertical engaging member 155. The piston arm 112 also comprises a second elongated member 157 that extends outward from a second vertical side 159 of the vertical engaging member 155, where the second side 159 is situated opposite from the first side 153. In one example, the second elongated member 157 extends from a location on the second side 159 that is above a location on the first side 159 from which the first elongated member 151 extends. However, other configurations are applicable as well.

The first elongated member 151 comprise a vertical retaining member 161 disposed toward a first end region 163 of the first elongated member 151. The first end region 163 is situated opposite from a second end region 165 that abuts the first side 153 of the vertical engaging member 155. The vertical retaining member 161 extends from a top surface 167 of the first elongated member 151 in a vertical direction away from a bottom surface 169 of the first elongated member 151. The vertical retaining member 161 is insertable into the cavity 147 of the corresponding piston 110, as shown in FIG. 2. This couples the first piston 108 to the first elongated member 151 and allows the sliding arm 112 to transition the first piston 108 in and out of the cavity/chamber 188 of the first piston housing 104, as shown in FIG. 2. The first end region 163, in the example of FIG. 1, is configured to mate with the recessed area 149 of the corresponding piston 108, as shown in FIG. 2.

The second elongated member 157 also comprises a vertical retaining member 171 disposed toward a first end region 173 of the second elongated member 157. The first end region 173 of the second elongated member 157 is situated opposite from a second end region 202 (FIG. 2) that abuts the second side 159 of the vertical engaging member 155. The vertical retaining member 171 extends from a bottom surface 175 of the second elongated member 157 in a vertical direction away from a top surface 177 of the second elongated member 157. The vertical retaining member 171 is insertable into the cavity 147 of the corresponding piston 110, as shown in FIG. 2. This configuration couples the second piston 110 to the second elongated member 157 and allows the sliding arm 112 to transition the second piston 110 in and out of the cavity/chamber 190 of the second piston housing 106, as shown in FIG. 2. The first end region 173, in the example of FIG. 1, is configured to mate with the recessed area 149 of the corresponding piston 110, as shown in FIG. 2.

FIG. 2 shows that the first piston 108 is disposed on the first elongated member 151 with the recessed area 149 abutting the top surface 167 of the first elongated member 151. FIG. 2 further shows that the second piston 110 is disposed on the second elongated member 157 with the recessed area 149 abutting the bottom surface 175 of the second elongated member 157. However, other configurations are applicable as well. It should be noted that, in one example, at least a portion of the pistons 108, 110 are substantially flush with the elongated members 151, 157 when disposed thereon, as shown in FIG. 2. For example, the bottom surface 169 of the first elongated member 151 is substantially flush with the fourth side 139 of the first piston 108 and the bottom surface 175 of the second elongated member 157 is substantially flush with the fourth side 139 of the second piston 110. The vertical engaging member 155 of the piston arm 112 extends above the first and second elongated members 151, 157. The second side 159 of the vertical engaging member 155 comprises a recessed area 179 that is configured to mate with the outward extending member 184 of the second piston housing 106 as the second piston 110 is transitioned a given distance into the second piston housing 106 by the piston arm 112.

Figure 3:
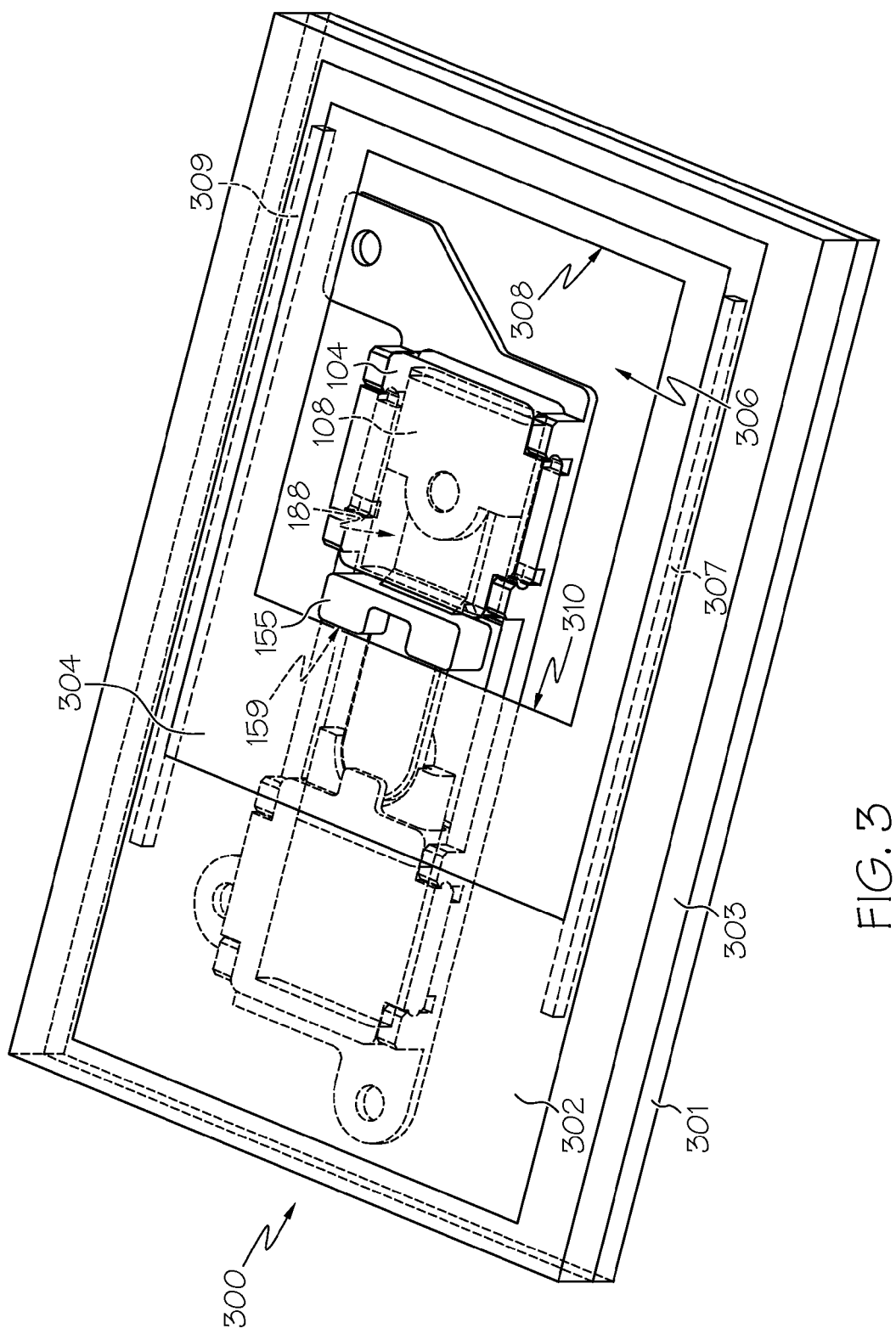
FIG. 3 shows a top-side view of the low profile air damper assembly of FIG. 1 coupled to a slide mechanism disposed on an electronic device according to one example.
Figure 4:
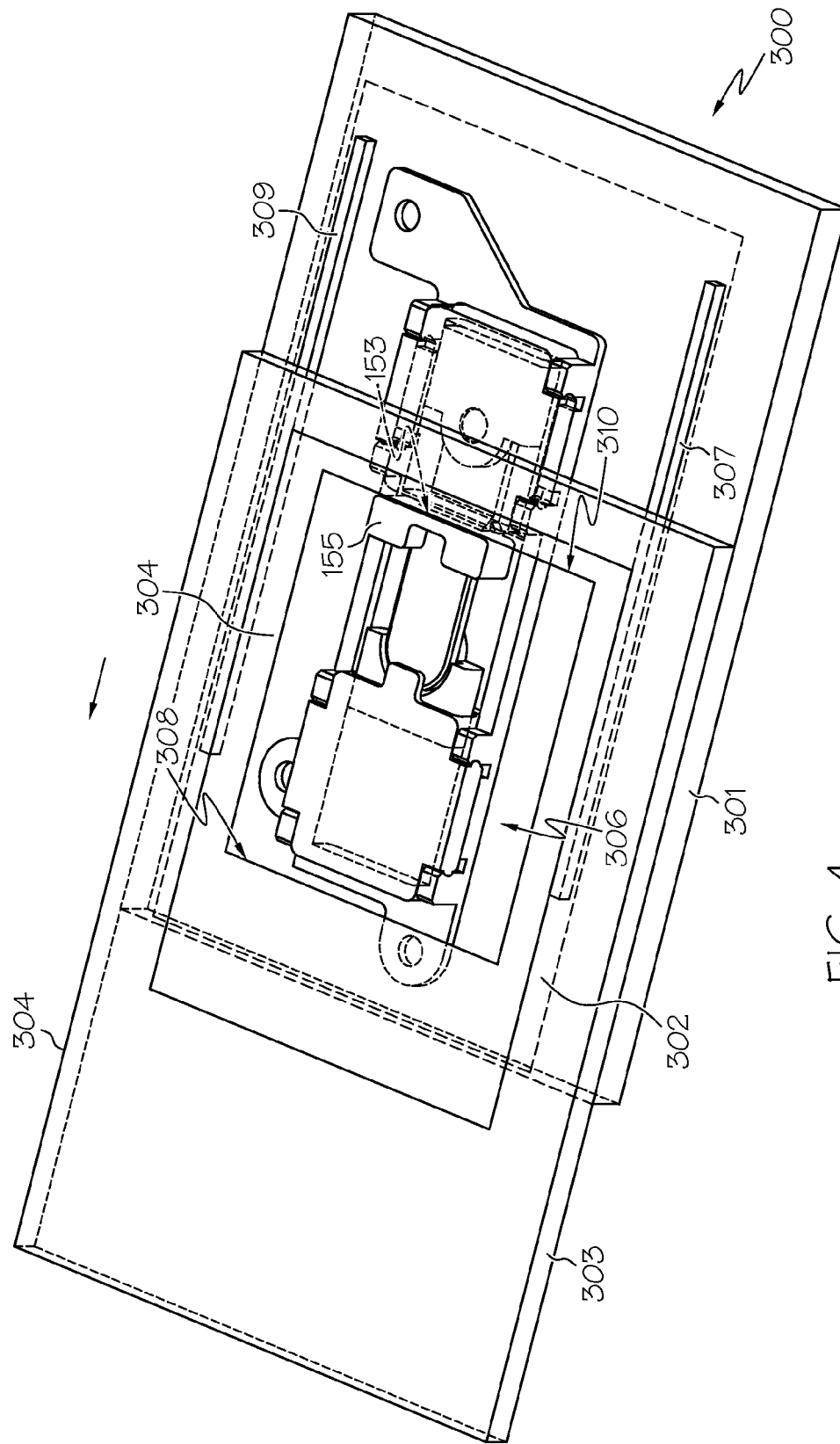
FIG. 4 shows a top-side view of the low profile air damper assembly of FIG. 1 with the slide mechanism of FIG. 3 being transitioned in a linear direction according to one example.

As discussed above, the air damper assembly 100 is coupled to a first portion 301 of a portable electronic device or a first portion 302 (e.g., a guide base) of a slide mechanism 311. The slide mechanism 311 allows a second portion 304 of the slide mechanism 311 (e.g., a slide plate) comprising, for example, a display to transition in a linear direction independent of the first portion 302 comprising, for example, a keyboard. FIGS. 3 and 4 show a portable electronic device 300 such as, but not limited to a wireless communication device, comprising a first portion 301 and a second portion 303. Various components of the portable electronic device 300, such as a keyboard and display, are not shown for simplicity. In the example of FIGS. 3-4, the first portion 301 of the portable electronic device 300 comprises the first portion 302 (e.g., a guide base) of the slide mechanism 311. The second portion 303 of the portable electronic device 300 comprises the second portion 304 (e.g., a slide plate) of the slide mechanism 311. In one example, the slide mechanism 311 collectively comprises at least the first portion 302, the second portion 304, and any components or mechanisms 307, 309 that allow the first and second portions 302, 304 to transition relative to each other. For example, FIG. 3 shows one or more guide rails 307, 309 that are coupled to the first portion 302 of the slide mechanism 311 that allow the second portion 304 of the slide mechanism to move in a linear direction with respect to the first portion 304. It should be noted that the example of the slide mechanism 311 shown in FIGS. 3-4 is only one configuration applicable to the present disclosure and does not limit the present disclosure in any way. It should be noted that one or more examples of the present disclosure are also applicable to portable mechanical devices as well, and are not limited to portable electronic devices.

In the example of FIG. 3, the air damper assembly 100 is coupled to the first portion 302 of the slide mechanism 311 where the second portion 304 (e.g., slide plate) of the slide mechanism 311 is disposed above the air damper assembly 100. In other examples, the air damper assembly 100 is coupled to the second portion 304 of the slide mechanism 311. The second portion 304 of the slide mechanism 311 can be disposed on a back surface of which ever portion 301, 303 of the portable electronic device 300 is configured to be moved in a linear direction. The second portion 304 of the slide mechanism 311 can include an engagement area 306 or engagement member that engages at least a portion of the vertical engaging member 155 of the piston arm 112 as the second portion 304 of the slide mechanism 311 is transitioned from a closed position to an open position and vice versa.

In the example of FIGS. 3-4, this engagement area 306 is a cut-out area in which at least a portion of the vertical engaging member 155 of the piston arm 112 extends above or is at least flush with at least a first side 308 and a second side 310 of the area 306, where the first side 308 and the second side 310 are disposed opposite from each other. As the second portion 304 of the slide mechanism 311 is transitioned a given distance or is a given distance from its end of travel, the first or second side 308, 310 of the engagement area 306 engages the first or second side 153, 159 of the vertical engaging member 155 of the piston arm 112, thereby transitioning the piston arm 112 in the direction of travel of the slide mechanism 311.

For example, FIG. 3 shows that first and second portions 301, 303 (and hence the first and second portions 302, 304 of the slide mechanism 311) are in a closed position or non-extended position. In this closed position or non-extended position the second side 310 of the engagement area 306 abuts the second side 159 of the vertical engaging member 155, as shown in FIG. 3. As can be seen from FIG. 3, when the slide mechanism 311 is in a non-extended position the first piston 108 has been transitioned into the cavity/chamber 188 of the first piston housing 104. FIG. 4 shows one example where the second portion 304 of the slide mechanism 311 has moved in a first linear direction with respect to the first portion 304 of the slide mechanism 311. For example, a user has transitioned the second portion 303 of the portable electronic device 300 to an extended position with respect to the first portion 301 of the portable electronic device 300. As the second portion 304 of the slide mechanism 311 is transitioned a given distance or is a given distance from its end of travel, a portion of the engagement area 306, such as the first side 308 in the example shown in FIG. 4, engages a portion of the vertical engaging member 155, such as the first side 153 of the member 155 in the example shown in FIG. 4.

As the second portion 304 of the slide mechanism 311 continues to move in the linear direction the engagement area 306 exerts a force against the vertical engaging member 155, which causes the piston arm 112 to transition one piston into its corresponding piston housing and the other piston out of its corresponding piston housing. In the example shown in FIG. 4, the second piston 110 is transitioned into the second piston housing 106 and the first piston 108 is transitioned out of the first piston housing 104. This process is reversed when the second portion 304 of the slide mechanism 311 is moved in the opposite direction. It should be noted that, in one example, a portion of the pistons always remain within the housings. It should also be noted that the engagement area/member 306 is not limited to being a cut-out area of the slide mechanism 311. For example, the second portion 304 of the slide mechanism 311 can include extending members or recessed areas that engage the vertical engaging member 155 of the piston arm 112.

As one piston 108 is moved into the cavity/chamber 188 of the housing 104, the piston 108 compresses the air within the cavity/chamber 188, thereby creating a first dampening effect that reduces the velocity of travel with respect to the slide mechanism 311. Also, as one piston 108 is transitioned into the cavity/chamber 188 the other piston 110 is transitioned out of the other cavity/chamber 190. When the other piston 110 is transitioned out of the other cavity/chamber 190 a vacuum is created in the other cavity/chamber 190, thereby creating a second dampening effect that further reduces the velocity of travel of the slide mechanism 311. These dampening effects of the dampening assembly 100 help stop the slide mechanism 311 and prevent components of the slide mechanism 311 from experiencing unnecessary stress. Also, undesired noises resulting from the slide mechanism 311 being stopped are reduced or eliminated by the damper assembly 100 since the velocity of the slide mechanism 311 is dampened. Even further, because the velocity of the slide mechanism 311 is dampened at the end of its travel, the user experiences a smoother, more enjoyable sliding motion.

Figure 5:
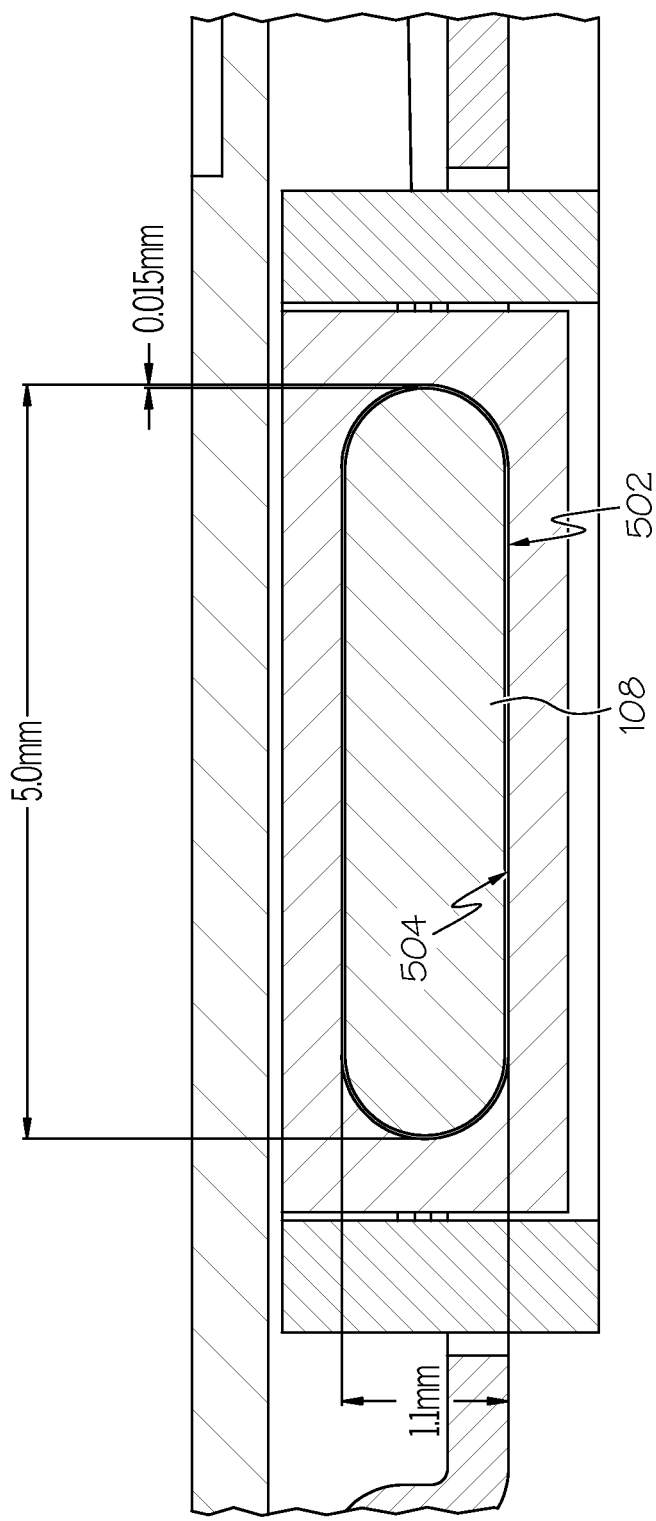
FIG. 5 shows a cross-sectional side view of the low profile air damper assembly of FIG. 1 according to one example.

FIG. 5 shows a cross-section of a piston 108 within the cavity/chamber 188 of its corresponding housing 104. As can be seen, there is a minimal gap, such as, but not limited to, a 0.015 mm gap, between the outer surface 502 of the piston 108 and the wall 504 of the cavity/chamber 188. In the example of FIG. 5 the width of the chamber is 5.0 mm, the height of the piston is 1.1 mm, and the area/gap between the outer surface 502 of the piston 108 and the wall 504 of the cavity/chamber 188 is 0.015 mm. Therefore, the blow-by-area (e.g., the area at which air passes between the outer surface 502 of the piston 108 and the wall 504 of the chamber) is 0.098 mm+(P×1 mm×0.015 mm)=0.128 mm$^2$/cylinder, where P is equal to 2 since there are two pistons in the air dampening assembly 100. The area, AI, of the pistons is 1.1 mm×5.0 mm×2 (pistons)=12 mm$^2$. It should be noted that these dimensions and values are only used for illustrative purposes and other dimensions and values can also apply as well. The blow-by-area, length of the chamber, length of the pistons, distance the piston travels, etc. can all be adjusted based on the dampening force desired.

Figure 6:
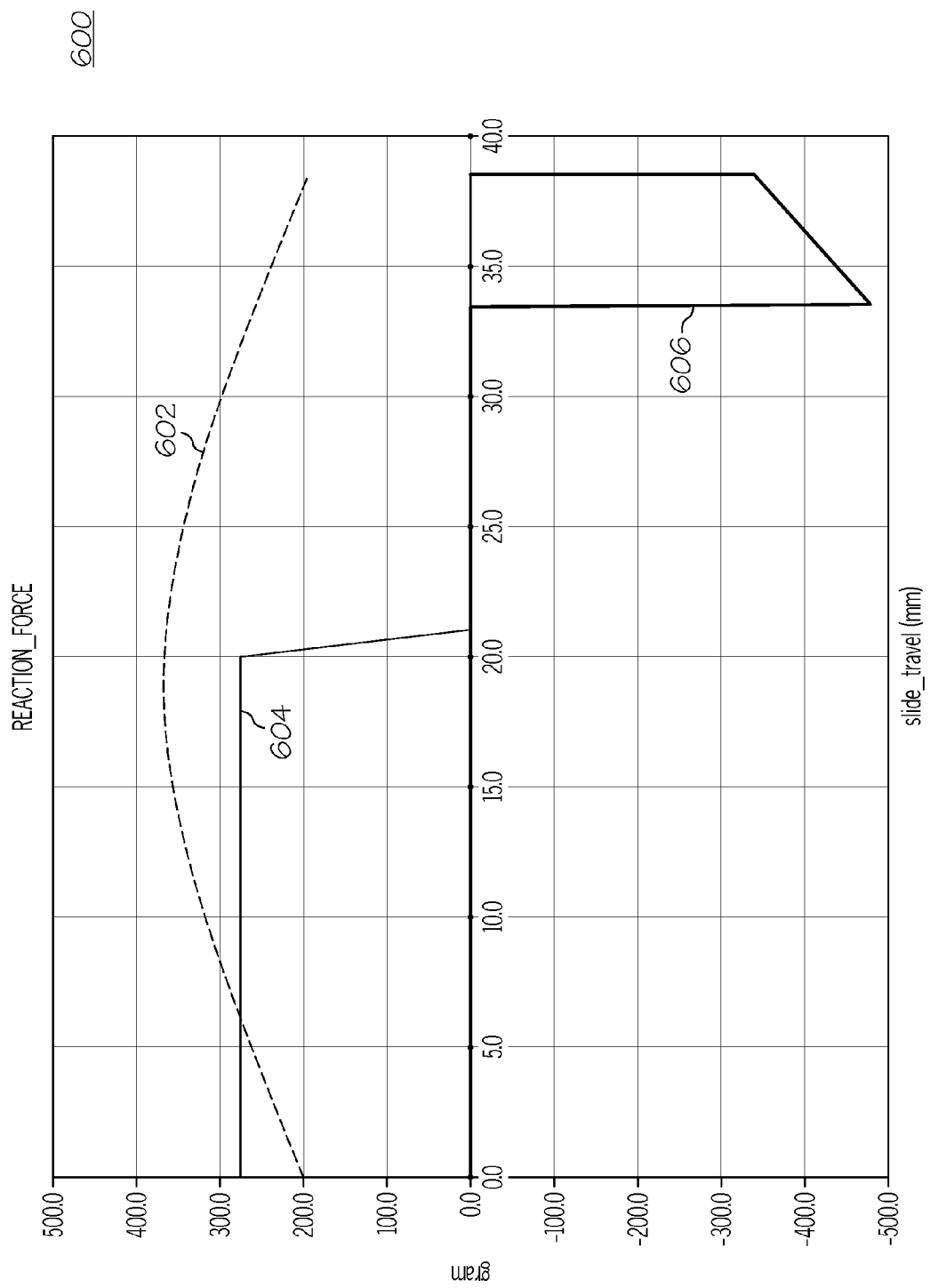
FIG. 6 shows a graph illustrating the reaction force experienced by the slide mechanism of FIG. 2 as the slide mechanism is moved in a linear direction and encounters the low profile air damper assembly of FIG. 1 according to one example.
Figure 7:
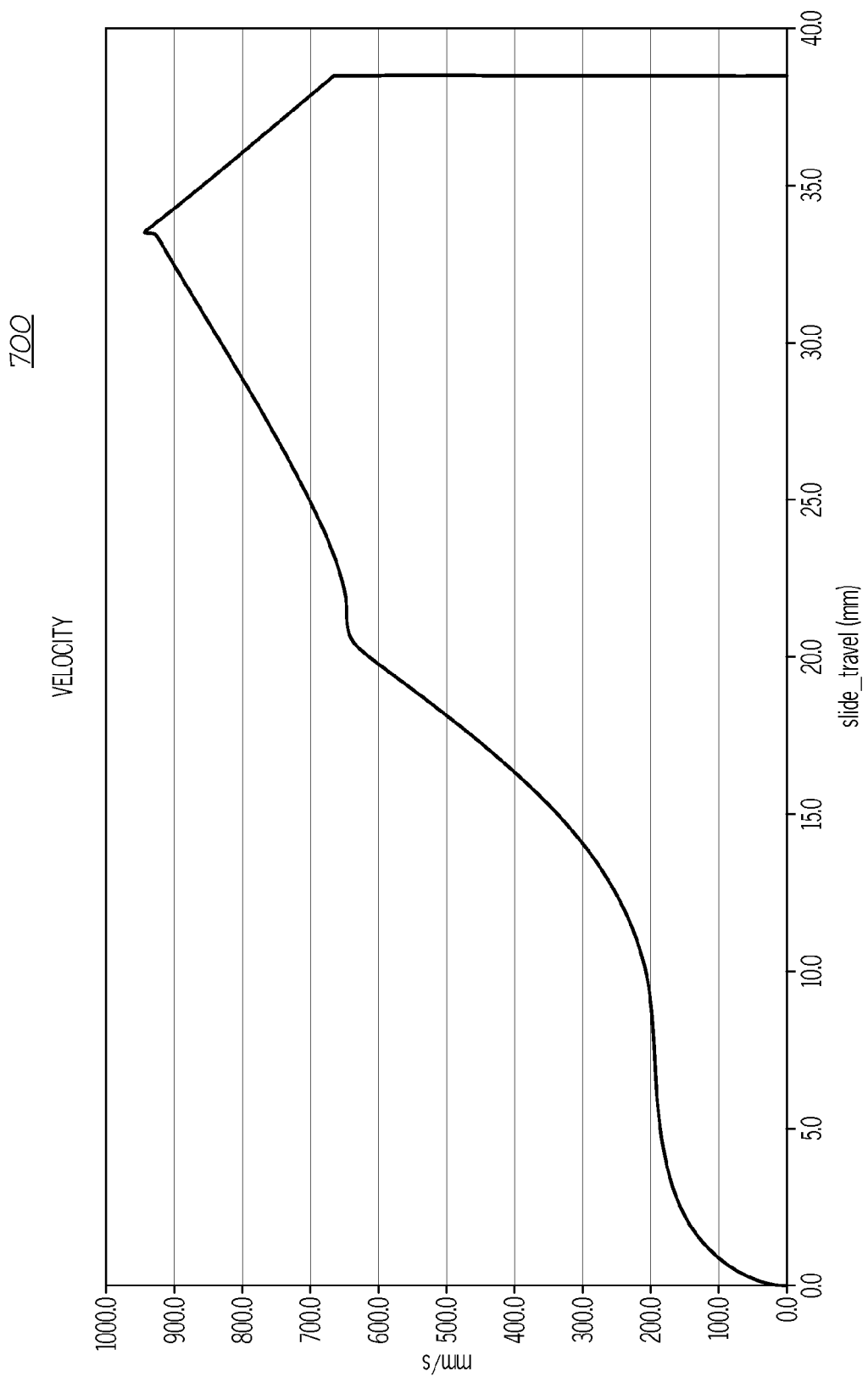
FIG. 7 shows a graph illustrating the reduction in velocity of the slide mechanism of FIG. 2 as the slide mechanism encounters the low profile air damper assembly of FIG. 1 according to one example.

FIG. 6 shows a graph 600 plotting the reaction force experienced by a slide mechanism as the slide mechanism is moved in a linear direction. The graph 600 shows a spring force of the mechanism represented by line sequence 602, an external force, such as the force exerted to initially move the slide mechanism, represented by line sequence 604, and a dampening force exerted by the damper assembly 100 represented by line sequence 606. As can be seen, as the slide mechanism travels a given distance the damper assembly 100 exerts a force that is opposite to the spring force. This results in the slide mechanism being slowed down as shown in FIG. 7. For example, the graph 700 of FIG. 7 shows that at around 33 mm of travel the slide mechanism is traveling around 950 mm/s. At this point, the slide mechanism engages the damper assembly 100 and between 33 mm and 37 mm of travel the damper assembly 100 reduces the velocity of the slide mechanism from about 950 mm/s to 680 mm/s. It should be noted that the data in FIGS. 6-7 is only used for illustrative purposes and the damper assembly 100 can be configured to provide varying dampening forces.

As can be seen, the damper assembly 100 provides a dampening force that reduces the velocity of a slide mechanism as the mechanism reaches a given distance from its end of travel. This reduces the forces experienced by the components of the slide mechanism that are utilized to stop the slide mechanism. Also, undesired noises resulting from the slide mechanism being stopped are reduced or eliminated by the damper assembly 100 since the velocity of the slide mechanism is dampened. Even further, because the velocity of the slide mechanism is dampened at the end of its travel, the user experiences a smoother, more enjoyable sliding motion.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. An electronic device, the electronic device comprising:
a base member;
a first piston housing having a first cavity and a first cavity opening, disposed on the base member;
a second piston housing having a second cavity and a second cavity opening, disposed on the base member, the second cavity opening being oriented linearly opposite the first cavity opening;
a sliding member disposed between the first piston housing and the second piston housing;
a first piston disposed on a first elongated member of the sliding member, the first piston housing, the first cavity, and the first cavity opening, being configured to receive the first piston; and
a second piston disposed on a second elongated member of the sliding member, the second piston oriented linearly opposite the first piston, the second piston housing, the second cavity, and the second cavity opening, being configured to receive the second piston,
where each of the first and second piston is sized and shaped relative to its respective cavity to provide a designed blow-by-area gap between an outer surface of each piston and a wall of its respective cavity such that, during linear movement of the first and second pistons, air flows through the designed blow-by-area gaps thereby slowing movement of the sliding member by an air compressing dampening force at one of the first and second piston and concurrently by an air vacuum dampening force at the other of the first and second piston.

2. The electronic device of claim 1, where the first piston housing comprises a first chamber configured to receive the first piston, and where the second piston housing comprises a second chamber configured to receive the second piston.

3. The electronic device of claim 2, where the sliding member is configured to transition the first piston into the first chamber and transition the second piston out of the second chamber as the first piston is being transitioned into the first chamber, where the first piston compresses air within the first chamber in response to being transitioned into the first chamber, and where the second piston creates a vacuum within the second chamber in response to being transitioned out of the second chamber.

4. The electronic device of claim 2, where the sliding member is configured to transition the second piston into the second chamber and transition the first piston out of the first chamber as the second piston is being transitioned into the second chamber, where the second piston compresses air within the second chamber in response to being transitioned into the second chamber, and where the first piston creates a vacuum within the first chamber in response to being transitioned out of the first chamber.

5. The electronic device of claim 1, where at least one of the first piston housing and the second piston housing comprises an extending member that extends outward from a top portion thereof towards a center region of the base member.

6. The electronic device of claim 1, where the sliding member comprises a vertical engaging member disposed between the first elongated member and the second elongated member, where at least a portion of the vertical engaging member is configured to engage at least a portion of a slide mechanism coupled to a portion of the electronic device as the slide mechanism transitions from a first position to a second position.

7. The electronic device of claim 6, where the portion of the slide mechanism exerts a force on the vertical engaging member as the slide mechanism is transitioning, where one of the first piston and the second piston is transitioned into a corresponding one of the first piston housing and the second piston housing, the one of the first piston and the second piston compressing air within the corresponding one of the first piston housing and the second piston housing in response to being transitioned therein, where the one of the first piston and the second piston exerts a dampening force, in response to compressing air, on the portion of the slide mechanism as the slide mechanism is transitioning, the dampening force reducing a velocity of the slide mechanism prior to the slide mechanism reaching the second position.

8. The electronic device of claim 6, where the vertical engaging member comprises a recessed area on a vertical side thereof that is configured to engage an extending member of at least one of the first piston housing and the second piston housing, the extending member extending outward from a top portion of the at least one of the first piston housing and the second piston housing towards a center region of the base member.

9. An electronic device, the electronic device comprising:
a first portion; and
a second portion, where the first portion and the second portion are configured to move in a linear direction with respect to each other,
the first portion being coupled to an air dampening assembly, the air dampening assembly comprising:
a base member;
a first piston housing disposed on the base member;
a second piston housing disposed on the base member opposite the first piston housing;
a sliding member disposed between the first piston housing and the second piston housing;
a first piston disposed on a first elongated member of the sliding member, the first piston housing being configured to receive the first piston; and
a second piston disposed on a second elongated member of the sliding member, the second piston housing being configured to receive the second piston,
where the first piston housing comprises a first chamber configured to receive the first piston, and where the second piston housing comprises a second chamber configured to receive the second piston,
where the sliding member is configured to transition the first piston into the first chamber and transition the second piston out of the second chamber as the first piston is being transitioned into the first chamber, where the first piston compresses air within the first chamber in response to being transitioned into the first chamber, and where the second piston creates a vacuum within the second chamber in response to being transitioned out of the second chamber, and
where a direction of the transition of the first piston into the first chamber and a direction of the transition of the second piston out of the second chamber are a same direction as the linear direction that the second portion moves with respect to the first portion.

10. The electronic device of claim 9 where the sliding member is configured to transition the second piston into the second chamber and transition the first piston out of the first chamber as the second piston is being transitioned into the second chamber, where the second piston compresses air within the second chamber in response to being transitioned into the second chamber, and where the first piston creates a vacuum within the first chamber in response to being transitioned out of the first chamber.

11. The electronic device of claim 9, where at least one of the first piston housing and the second piston housing comprises an extending member that extends outward from a top portion thereof towards a center region of the base member.

12. The electronic device of claim 9, where the sliding member comprises a vertical engaging member disposed between the first elongated member and the second elongated member, where at least a portion of the vertical engaging member is configured to engage at least a region of the second portion of the slide mechanism as the second portion of the slide mechanism is transitioning from a first position to a second position, and where the vertical engaging member comprises a recessed area on a vertical side thereof that is configured to engage an extending member of at least one of the first piston housing and the second piston housing, the extending member extending outward from a top portion of the at least one of the first piston housing and the second piston housing towards a center region of the base member.

13. An electronic device, the electronic device comprising:
a first portion;
a second portion; and
a sliding mechanism, where the first portion is coupled to a guide member of the sliding mechanism, and where the second portion is coupled to a transitioning member of the sliding mechanism, where the sliding mechanism further comprises an air dampening assembly coupled to the guide member, the air dampening assembly comprising:
a base member;
a first piston housing disposed on the base member;
a second piston housing disposed on the base member opposite the first piston housing;
a sliding member disposed between the first piston housing and the second piston housing;
a first piston disposed on a first elongated member of the sliding member, the first piston housing being configured to receive the first piston; and
a second piston disposed on a second elongated member of the sliding member, the second piston housing being configured to receive the second piston, where the sliding member is configured to transition the second piston into the second chamber and transition the first piston out of the first chamber as the second piston is being transitioned into the second chamber, where the second piston compresses air within the second chamber in response to being transitioned into the second chamber, and where the first piston creates a vacuum within the first chamber in response to being transitioned out of the first chamber, where a direction of the transition of the second piston into the second chamber and a direction of the transition of the first piston out of the first chamber are a same direction as the linear direction that the second portion moves with respect to the first portion.

14. The electronic device of claim 13, where the first piston housing comprises a first chamber configured to receive the first piston, and where the second piston housing comprises a second chamber configured to receive the second piston, and where the sliding member is configured to transition the first piston into the first chamber and transition the second piston out of the second chamber as the first piston is being transitioned into the first chamber, where the first piston compresses air within the first chamber in response to being transitioned into the first chamber, and where the second piston creates a vacuum within the second chamber in response to being transitioned out of the second chamber.

15. The electronic device of claim 13, where at least one of the first piston housing and the second piston housing comprises an extending member that extends outward from a top portion thereof piston towards a center region of the base member.

16. The electronic device of claim 13, where the sliding member comprises a vertical engaging member disposed between the first elongated member and the second elongated member, where at least a portion of the vertical engaging member is configured to engage at least a region of the transitioning member as the transitioning member portion is transitioning from a first position to a second position.

17. The electronic device of claim 16, where the vertical engaging member comprises a recessed area on a vertical side thereof that is configured to engage an extending member of at least one of the first piston housing and the second piston housing, the extending member extending outward from a top portion of the at least one of the first piston housing and the second piston towards a center region of the base member.

* * * * *